June 8, 1926.

L. RONCA ET AL 1,587,555

COMBINED BUMPER AND FENDER

Filed Feb. 3, 1925

2 Sheets-Sheet 1

INVENTOR
Louis Ronca and
Stanislao Santoro.

BY

ATTORNEY

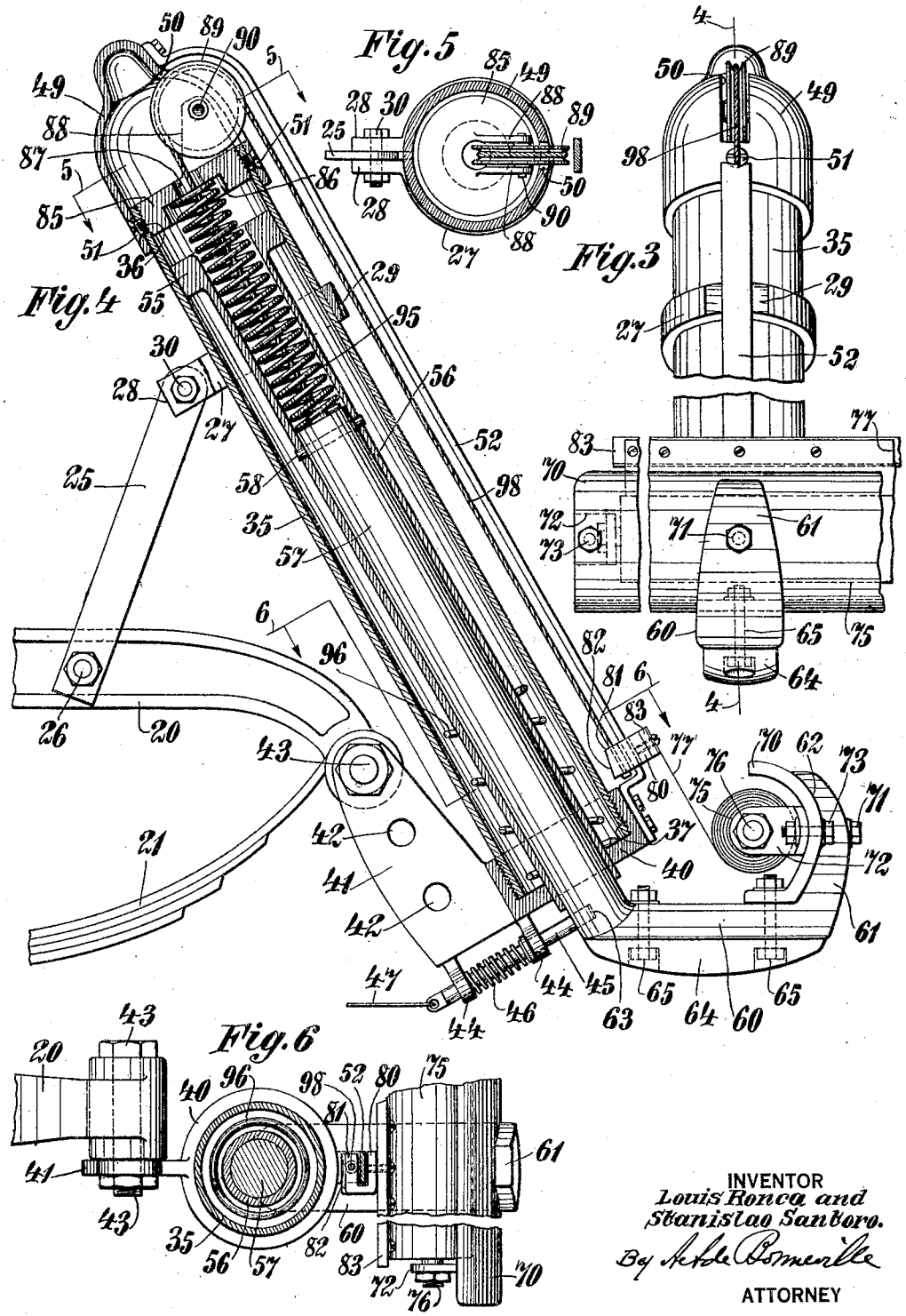

Patented June 8, 1926.

1,587,555

UNITED STATES PATENT OFFICE.

LOUIS RONCA AND STANISLAO SANTORO, OF JERSEY CITY, NEW JERSEY.

COMBINED BUMPER AND FENDER.

Application filed February 3, 1925. Serial No. 6,549.

This invention relates to a combined bumper and fender, and is an improvement of our combined bumper and fender for which we filed an application on July 5th, 1924, bearing Serial Number 724,317, now Patent 1,570,527, granted January 19, 1926.

The object of the present invention is the production of a safety net or curtain for a vehicle, by means of which injury is prevented to persons that may come in the path of the vehicle. The second object of the invention is the production of a safety device for a vehicle which can be quickly located in operative position, when said vehicle is at rest or in motion. The third object of the invention is the production of a device having a safety net or curtain, that can be easily attached to the various forms of motor vehicles.

The organization of the invention comprises a spring actuated shade roller with a curtain, which upon the release of a pair of latch pins has said curtain unwound therefrom. The curtain when unwound constituted a flexible support or net to catch a person that comes in the path of the vehicle when moving. It is to be understood that various different objects that may be in the path of the vehicle are caught by the bumper and fender and thereby injury to the vehicle prevented.

Figure 1:
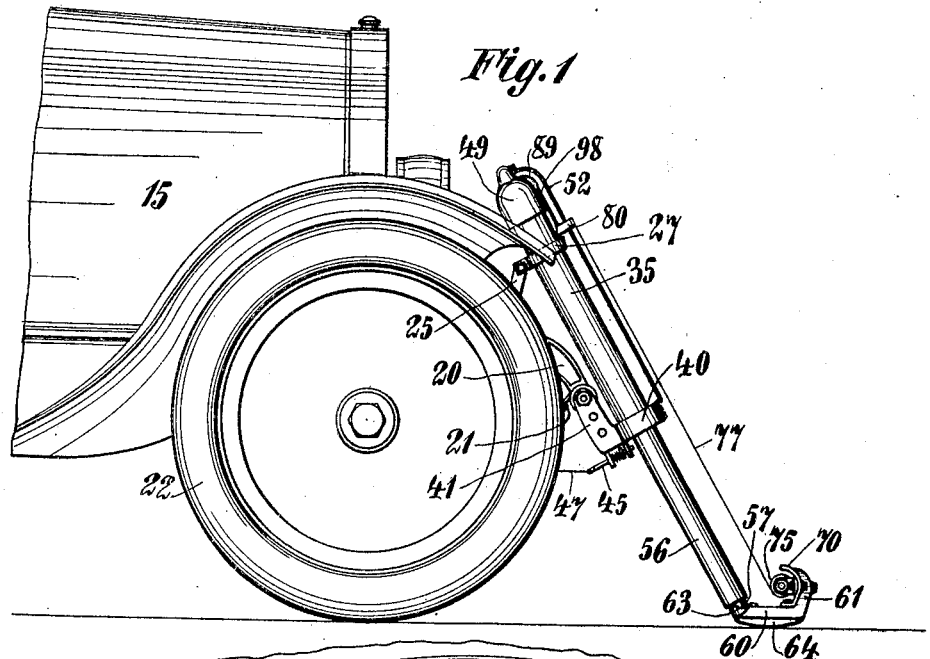
Figure 2:
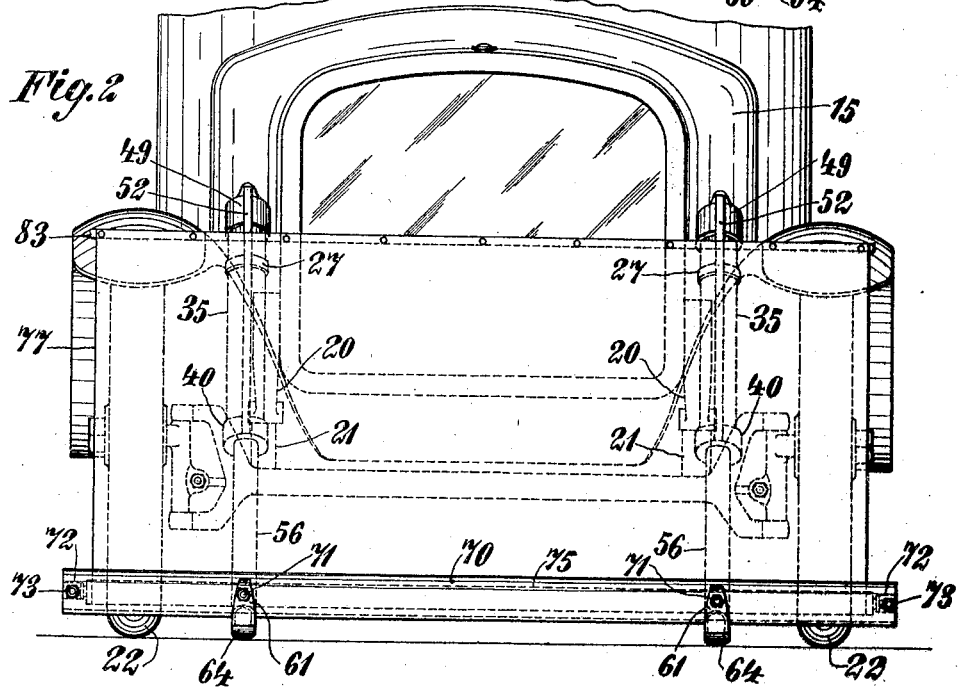

In the accompanying drawings Fig. 1 represents a side view of an exemplification of the combined bumper and fender in operative position with a fragmentary portion of an automobile; Fig. 2 is a right hand side view of Fig. 1; Fig. 3 shows an enlarged fragmentary portion of Fig. 2; Fig. 4 is a section of Fig. 3 on the line 4, 4 with a fragmentary portion of the automobile to which it is attached; Fig. 5 indicates a section of Fig. 4 on the line 5, 5 and Fig. 6 is a section of Fig. 4 on the line 6, 6.

A fragmentary portion of a vehicle, in this instance an automobile is indicated at 15 with a portion of the members 20 of its frame, the springs 21 and the front wheels 22. A link 25 is provided for each of the frames 20 and the lower end of each link is fastened to its accompanying frame, by means of the bolt 26. A clamping ring 27 is indicated with the jaws 28 and the tapered recess 29. The jaws 28 are bolted to the upper end of the link 25, by means of the bolt 30. The barrel 35 of the bumper and fender is secured in place adjacent its upper end by clamping ring 27. The barrel 35 has the internal thread 36 at its upper end and the external thread 37 at its lower end.

A pair of supporting brackets each with the internally threaded cap shaped pocket 40 are provided with the arms 41 having each a plurality of openings 42. The upper end of each arm 41 is connected to the forward end of one of the frames 20 by means of the bolt 43. A pair of guide lugs 44 extend from each of said brackets and support a latch pin 45. A spring 46 encircles each latch pin 45 between the lugs 44. An operating rope 47 has one end fastened to each of the latch pins 45. A cap 49 with the opening 50 in its wall is detachably fastened to the upper end of each barrel 35, by means of the screws 51. A guide rod 52 is provided for each barrel 35 and its upper end is fastened to the cap 49 while its lower end is fastened to the outer face of the wall of the pocket 40. Within each barrel 35 is indicated a tubular piston with the head 55 from which extends the tubular shank 56. A cylindrical shank 57 is located in the tubular shank 56 and its upper end is spaced from and below the head 55, and is fastened to the said tubular shank by means of the pin 58. An arm extends from the lower end of the cylindrical shank 57, and comprises the horizontal member 60 and the vertical member 61 with the inner concaved face 62. A latch opening 63 is formed in each shank 57 for the latch pin 45. A shoe 64 is fastened to the lower face of the member 60 by means of the bolts 65.

A concavo convex bumper 70 has its ends fastened to the members 61 by means of the bolts 71. A pair of journal brackets 72 are bolted to the concaved face of the bumper 70, by means of the bolts 73.

A spring actuated shade roller 75 is indicated with its journal pins 76, that are journaled in the journal brackets 72. A curtain 77 has one end fastened to the shade roller 75 in the usual manner. A pair of U shaped supports are each indicated with the members 80 and 81, which are located on opposite sides of the guide rods 52. A tapered projection 82 extends from the member 81. A bar 83 is fastened adjacent to its ends to the members 80, and in turn has fastened thereto the outer end of the curtain 77.

A head 85 has an exterior thread which is in engagement with the thread 36 at the upper end of the barrel 35. An axial opening 86 with the opening 87 smaller in diameter is formed in the head 85. A pair of journal brackets 88 extend up from the head 85. A pulley 89 is indicated with the shaft 90 which latter is journaled in the upper ends of the brackets 88. A spring 95 is located with one end in the cavity 86 and its upper end bears against the roof of said cavity. The spring 95 extends through the head 55 and into the tubular shank 56, and its lower end bears against the top end of the cylindrical shank 57. A buffer spring 96 is located within the barrel 35, and its lower end bears on the inner face of the pocket 40. Cables 98 have each one end fastened to the upper end of each cylindrical shank 57, lead through the springs 95 and over the pulleys 89. The other ends of the said cables extend through openings in the members 81 of the said U shaped supports and support the latter.

To operate the combined bumper and fender from its closed position as indicated in Figs. 3, and 4, the user pulls the operating ropes 47 and unlocks the latch pins 45 from the latch openings 63 in the shanks 57. Thereby the tension of the springs 95 force down the tubular pistons having the heads 55 and the shanks 57. The heads 55 at the lower ends of their strokes are cushioned on the springs 96. With the downward stroke of the shanks 57, the U shaped brackets having the members 80 and 81 are pulled up, by means of the cables 98, and at the same time the bumper 70 with the shade roller 75 is lowered. Thereby the curtain 77 which constitutes a safety net, is unwound from said shade roller 75 and located in operative position in front of the automobile as indicated in Figs. 1 and 2.

It will be noted that while the shade roller 75 is descending, the free end of the curtain 77 is rising, thereby accelerating the unwinding of said curtain. This insures the rapid location of the curtain to its unwound position and provides means for a single curtain to be simultaneously unwound in opposite directions.

When the U shaped supports having the members 80 and 81 reach the upper ends of their stroke, the tapered projections 82 pass the tapered recesses 29 of the rings 27, and are locked with the latter as indicated in Fig. 1.

When it is required to locate the bumper and fender in its closed position as shown in Figs. 3 and 4, the operator raises the bumper 70 until the latch pins 45 lock with the latch openings 63 as clearly shown in said Fig. 4. The openings 42 in the arms 41 serve to locate the bumper and fender at different levels to suit vehicles with wheels of different diameters.

Various modifications may be made in the invention and the present exemplification is to be taken as illustrative and not limitative thereof.

Having described our invention what we desire to secure by Letters Patent and claim is:

1. The combination of a barrel connected to a vehicle, a movable spring actuated shank extending into the barrel, a bumper associated with the lower end of the shank, a spring actuated roller carried by the bumper, a curtain normally wound around the roller with one end fastened thereto, a cable extending into the barrel with one end fastened to said shank and the other end of the cable in connection with said curtain, the coaction of the elements securing the spreading of the curtain simultaneously in two directions, and means to lock said shank in a predetermined position.

2. The combination of a pair of barrels connected to a vehicle, a movable spring actuated shank extending into each barrel, a bumper associated with the lower end of each shank, a spring actuated roller carried by the bumper, a curtain normally wound around the roller with one end fastened thereto, a cable extending into each barrel with one end fastened to the said shank therein and their other ends in connection with the free end of said curtain, the coaction of said elements adapted to lower the roller with the curtain thereon and simultaneously elevating the free end of the curtain, and means to lock the shanks in a predetermined position.

3. The combination of a pair of barrels connected to a vehicle, a head for the upper end of each barrel having an opening and a pair of journal brackets extending up from the head, a pulley journaled to said journal brackets, a movable shank extending into and through the lower end of each barrel, a spring in each barrel bearing between its head and the upper end of the shank therein, an arm extending from the lower end of each shank, a bumper fastened to the arms, a shoe extending from each arm, a spring actuated roller for said bumper, a curtain normally wound around the roller with one end fastened thereto, a guide rod extending the length of each barrel and parallel thereto, a U shaped support slidably supported on each guide rod, a cable extending into each barrel with one end fastened to the upper end of each shank, the cables extending through the openings of the heads of the barrels, and leading over the pulleys at the upper ends of the barrels, a bar connecting the U shaped supports and having connected thereto the free end of said curtain, a latch pin to lock each of said shanks in position and an operating rope to unlock each latch pin.

Signed at the Borough of Manhattan, city of New York in the county of New York and State of New York this 9th day of January, A. D. 1925.

LOUIS RONCA.
STANISLAO SANTORO.